United States Patent [19]
Lacoste

[11] 4,347,000
[45] Aug. 31, 1982

[54] INTERFEROMETRIC SYSTEM
[75] Inventor: Francois P. G. Lacoste, Norwalk, Conn.
[73] Assignee: The Perkin-Elmer Corporation, Norwalk, Conn.
[21] Appl. No.: 106,874
[22] Filed: Dec. 26, 1979
[51] Int. Cl.³ .............................................. G01B 11/00
[52] U.S. Cl. .................................................. 356/360
[58] Field of Search ......................................... 356/360
[56] References Cited U.S. PATENT DOCUMENTS
3,767,307  10/1973  Bowker ........................... 356/360 X FOREIGN PATENT DOCUMENTS
474809  11/1937  United Kingdom ................ 356/360
680167  10/1952  United Kingdom ................ 356/360

Primary Examiner—John K. Corbin
Assistant Examiner—Matthew W. Koren
Attorney, Agent, or Firm—S. A. Giarratana; E. T. Grimes; T. P. Murphy

[57] ABSTRACT

An interferometric system for testing a lens comprises a source of light and a beam splitter in the path of the light divides the light into first and second beams. A device is provided for holding the lens to be tested in the first beam. A reflector is disposed in the path of the first beam beyond the lens for reflecting the first beam to the beam splitter. A movable reflector is provided in the path of the second beam for reflecting the second beam to the beam splitter to form a single recombined beam. The movable reflector is displaceable in translation along the axis of the beam it reflects and in rotation about an axis or orthogonal axes in the plane of the movable reflector and perpendicular to the beam axis. The entire recombined beam impinges on a photoelectric detector which, in response thereto, generates an electrical signal representing the complex point spread function of the lens being tested.

9 Claims, 4 Drawing Figures

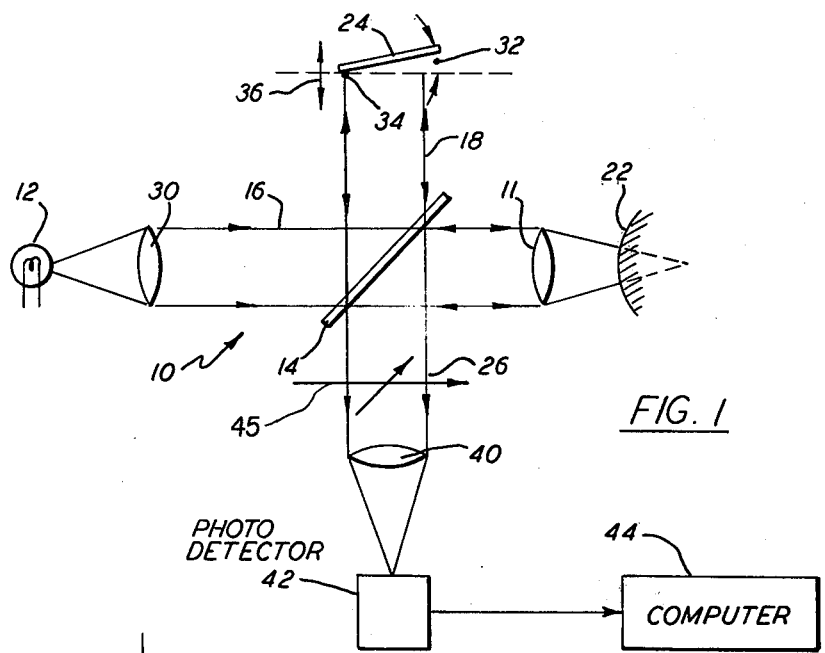
FIG. 1
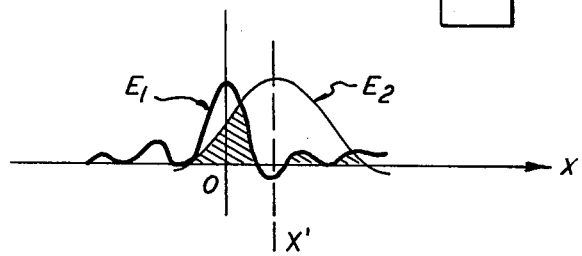
FIG. 2
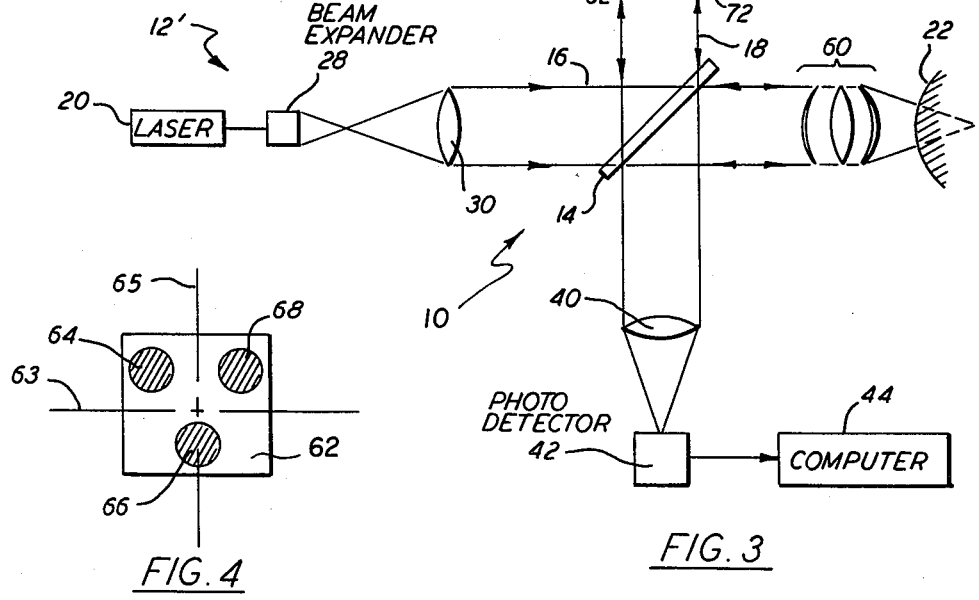
FIG. 4
FIG. 3

INTERFEROMETRIC SYSTEM

BACKGROUND OF THE INVENTION

While the invention is subject to a wide range of applications, it is especially suited for use in an interferometric system for testing a lens and will be particularly described in that connection.

The quality of a lens is primarily determined by the shape of its point spread function (PSF) or its optical transfer function (OTF). At present, direct measurements of the PSF are carried out by either photographic or electromechanical methods. These include a slit or pin hole scanning of the focal plane. Either of these methods allows the measurement of the square of the modulus of the electric field of the image and leaves its phase unknown. In order to determine the phase, a two-dimensional Fourier Transform is performed on the optical path difference (OPD) at the pupil of the lens to be tested. This OPD is measured by interferometric methods. In the past, several different techniques were used for evaluating the quality of a lens. For example, clasically PSF measurements were made by obtaining the phase and then the OPD at the pupil. This was a rather complicated, time consuming procedure. The present invention requires less experimental time due to multiplexing and provides a simplified mechanical design without slits and a minimum of movable parts. Also, the present invention provides for easy computer interface.

Another popular technique for evaluating lenses uses interferometric methods as disclosed in U.S. Pat. No. 3,936,160 to Von Bieren which discloses for example "An interferometer method for measuring aberrations in a lens system by analysis of a Fourier Transform pattern generated by the lens system". Another use of interferometric measurements is disclosed in U.S. Pat. No. 3,912,394 to Keisall which discloses for example a method and system of interferometric measurements of modulation transfer function.

The present invention provides significant improvements over the prior interferometric methods. These include full elimination of two $\pi$ uncertainty on the phase, which allows for complete mapping of the wave front. The mapping is possible even when strong distortions are present such as in the case of inexpensive lenses or aspheric elements. Further, the invention is less expensive than the prior art because no Vidicon is involved. The electronic interface is much less complicated and the measurements at all of the wavelengths are made by simply changing a source and a single detector. Thus, a scanning detector is unnecessary. Problems which might arise from diffraction at the borders of the pupil are eliminated. The present device provides easy computer interfacing. The need for overdimensional interferometers is eliminated as opposed to the prior known shear method. The calculation of MTF, the Fourier Transform of (complex PSF)$^2$, is more difficult than to calculate the autocorrelation of the OPD. Finally, no holograms are required with the present method.

The present method has some definite advantages over the MTF measurements which are the periodical-noise correlation pattern imaging. The present method includes the correlation of the OPD which eliminates any problems of orientation of phase. Also, the time of experimentation is reduced due to the multiplexing. The equipment for performing the present calculations is of a simplified mechanical design. Further, there are no errors due to the finite object size. In addition, errors do not occur due to nonsinusoidal or nonlinear patterns. Also, no photographic processes are involved and no problems of noise correlation.

In the present invention, the technique is a multiplexing method for measuring the PSF. In other words, all of the light from the lens to be tested arrives on the detector instead of a small fraction of it as with the traditional methods using slits or pinholes. The consequence is a much faster recording time. Also, virtually unlimited resolution can be achieved which is not generally the case of the traditional methods since they obtain a convolution of the PSF with the transparency function of the slit or pinhole.

Further, as mentioned above, the OPD, OTF and MTF can be obtained by performing a two dimensional Fourier Transform on the measured CPSF or the square of its modulus, the PSF, on a digital computer. The method of measuring these quantities can be thought of as a Fourier Transform multiplexing process in the sense that the light from the whole area of the pupil is received by the detector at the same time. Here also, the time and measurement and resolution can be improved by orders of magnitude as the limiting factor is the time of computation of the two dimensional Fourier Function Transform. In addition, the present invention overcomes the problem of reducing the interferograms obtained by the basic Twyman-Green interferometer to an OPD map. Also, another advantage of the present invention is the ability to test rough surfaces.

It is an object of the present invention to provide a method and apparatus of measuring the quality of a lens.

It is an additional object of the present invention to provide an interferometric system which can very quickly determine the quality of a lens.

It is a still further object of the present invention to provide unlimited resolution of the lens to be tested.

It is a still further object of the present invention to provide an interferometric system which can measure many different types of lenses.

SUMMARY OF THE INVENTION

Accordingly, there has been provided an interferometric system for testing a lens comprising a source of light. A beam splitter in the path of the light divides the light into first and second beams. A device is provided for holding the lens to be tested in the first beam. A reflector is disposed in the path of the first beam beyond the lens for reflecting the first beam to the beam splitter. A movable reflector is provided in the path of the second beam for reflecting the second beam to the beam splitter to form a single recombined beam. By positioning the movable reflector symmetrically with respect to the combination of the reflector and lens to be tested, the intensity of the recombined beam is maximized to permit ready detection of changes in intensity.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 1 is a schematic showing an embodiment of the interferometer of the present invention;

FIG. 2 is a graph of the electric fields at the detector;

FIG. 3 is a second embodiment of an interferometer of the present invention; and FIG. 4 is an enlarged partial sectional view on line 4—4 of FIG. 3.

DESCRIPTION OF THE PREFERRED EMBODIMENT

Referring to FIG. 1, an optical system 10 for testing a lens 11 takes the general form of a Twyman-Green interferometer comprising a beam splitter 14 and reflectors 22, 24. Reflector 22 preferably is a convex spherical minor. A light source 12 and a collimating lens 30 coact to form and direct a coherent or quasi-coherent light beam 16 onto beam splitter 14 at a 45 degree angle of incidence. If desired, a laser may be employed as the light source. A portion of the light of beam 16 is transmitted by beam splitter 14 and the remainder is reflected to form a second beam 18 also incident on beam splitter 14 at an angle of 45 degrees. Beam 16 strikes and is reflected back to beam splitter 14 by reflector 22; beam 18 strikes reflector 24 which reflects it back to the beam splitter where a portion is transmitted and combines with beam 16 to form a beam 26. For additional details and information regarding Twyman-Green interferometers, reference may be had to *Modern Optics* by Earle B. Brown, Rhinehold Publishing Corporation, 1965, pages 414 to 419.

A lens 40 directs the entire recombined beam 26 to a photoelectric detector 42 the output of which is connected to a conventional computing device 44 such as a digital computer.

Reflector 24, preferably a plane mirror, is mounted in any suitable manner for displacement in translation along the axis of beam 18, as indicated by double-headed arrow 36, and for rotation about a second axis 34 in the plane of the reflector and perpendicular to the axis of beam 18. Preferably the second axis, 34, extends along an edge of the reflector 24. Thus, by any suitable means, reflector 24 can be moved rectilinearly toward and away from beam splitter 14 and rotationally displaced about axis 34 through a tilt angle 32. As will be more fully explained in conjunction with the embodiment of the invention shown in FIGS. 3 and 4, the movable reflector can be rotated about two mutually orthogonal axes in the plane of the reflector.

The lens 11 to be tested is disposed in the path of beam 16 between beam splitter 14 and reflector 22 by any conventional holding device, not shown. Displacement of reflector 24 maximizes the intensity of the single recombined beam 26 by positioning the movable reflector symmetrically with respect to the combination of the reflector and lens to be tested.

In operation, the lens to be tested is set in the interferometer in the conventional manner. A light beam is split by the beam splitter 14 into first and second beams 16 and 18 respectively. Then the first and second beams reflect back to the beam splitter and form a single recombined beam 26. However, instead of observing the fringes in the plane 45 as is usually done, the single recombined beam 26 is focused through a lens 40 onto a detector 42. When the plane mirror 24 is translated along the 46 of beam 18 and/or rotated about axis 34 through a tilt angle 32, the recorded intensity varies sinusoidally (provided the source of light 12 is coherent). The maximum intensity is then obtained.

A contrast defined as the maximum intensity minus the minimum intensity divided by twice the average intensity is a function of the quality of the lens and the alignment of the movable reflector 24. The underlying principal of the present invention is that the contrast mentioned above is proportional to the amplitude of the complex point spread function (CPSF). Thus, by obtaining the contrast, the CPSF can be determined and the quality of the lens evaluated.

The first required calculation is the intensity at the detector 42 as a function of the tilt angle and the distance of the plane mirror to its best position (i.e. the one where the plane mirror and an equivalent mirror formed by the test lens 11 and the spherical mirror 22 are symmetrical with respect to the beam splitter 14). $E_1$ and $E_2$, as illustrated in FIG. 2, are the electric fields at the detector, produced by the beams of light from the plane mirror and the equivalent mirror respectively. The detector measures the intensity:

$$I = \int_{\text{surface of detector}} dx\,dy\, (E_1 + E_2)^2$$

$$= I_1 + I_2 + 2\,Re \int dx\,dy\, E_1^\dagger E_2;$$

$$= I_1 + I_2 + I'$$

where $I_1$ and $I_2$ are the intensities of the light produced by the plane mirror and the equivalent mirror independently and $I'$ is the varying term representing the interference between these mirrors. The electric fields $E_1$ and $E_2$ can be expressed as the Fourier Transform of the fields $\tilde{E}_1(\xi,\eta)$ and $\tilde{E}_2(\xi,\eta)$ at the mirror 24 and at the pupil of the lens 11, respectively, multiplied by the OPD introduced by the aberrations of the output lens 40:

$$\exp[i\phi(\xi,\eta)]\, E_k(x,y) = \int_{\text{pupil}} d\xi\,d\eta\, \tilde{E}_k(\xi,\eta)\, \exp i[(\xi x + \eta y) + \phi(\xi,\eta)]; k = 1,2$$

where $\xi$ and $\eta$ are the reduced coordinates: $\xi = 2\pi x/\lambda f o$, $\eta = 2\lambda y/\lambda f o$ When mirror 24 is tilted by angles $(\alpha = (2x'/fo)$, $\beta = (24'/fo)$ x' and y' are the corresponding shifts of the image to the source by mirror 24 in the focal plane of the output lens 40. The electric field produced by 24 can now be written:

$$E'_1(x,y) = \int_{M_1} d\xi\,d\eta\, \exp\cdot i\phi(\xi,\eta)\, \tilde{E}_1(\xi,\eta)\, \exp i\,[(x - x')\xi + (y - y')\eta]$$

where $E_1(\xi,\eta)$ is the field at 24 in the absence of tilting. Thus, the varying term $I'$ in the intensity at the detector can be written as the cross correlation between the field produced by the mirror and equivalent mirror of the interferometer:

$$I'(x',y') = 2Re \int_{\text{detector}} dx\,dy\, E_1^\dagger(x - x', y - y') E_2(x,y)$$

Since the area of the detector is always larger than the PSF, the limits of the integral are infinity.

This expression can be simplified using the convolution theorem:

$$I(x',y') =$$

$$2Re \int_{aperture} d\xi d\eta \, \tilde{E}^*_1(\xi,\eta)\tilde{E}_2(\xi,\eta) \exp + i(\xi x' + \eta y')$$

If now 24 is perfectly plane and its aperture is greater than the lens to be tested, the term $\tilde{E}_1(\xi,\eta)$ reduces to $(\exp-4i\pi z/\lambda)\sqrt{I_1} D(\xi,\eta)$ where z is the distance of 24 to its best position, and D is the transparency of the pupil, yielding $$I'(x',y') =$$

$$2R_e \sqrt{I_1} \int_{lens\ pupil} d\xi d\eta \, E_2(\xi,\eta) \exp i(\xi n' + \eta y') \exp(-4i\pi z/\lambda)$$

$$= 2\sqrt{I_1} R_e A(x',y') [\exp -4i\pi z/\lambda]$$

where A(x',y') is the Complex Point-spread function, Fourier Transform of the OPD at the pupil. By setting 24 at z=0 and z=λ/8 successively, one can measure the real and imaginary part of the PSF, respectively, as the mirror is tilted.

Thus, a multiplexing method for measuring the CPSF has been provided since all of the light from the lens to be tested arrives on the detector instead of only a small fraction as with the traditional methods using slits or pinholes. The advantages of this technique are virtually unlimited resolution as well as a faster recording time. Also, as mentioned in the introduction, the OPD, OTF, and MTF can be obtained by performing a two dimensional Fourier Transform on the measured CPSF of the square of its molulus the PSF on the digital computer 44. Thus, this method of measuring these quantities are a Fourier transform multiplexing process since all of the light from the whole area of the pupil is received by the detector at the same time. Here again, the time of measurement and the resolution can be improved by orders of magnitude since the only limitation is the time required for the computation of the two dimensional Fourier Transform.

A second embodiment of the present invention is illustrated in FIG. 3 wherein a Twyman-Green interferometer 10 of the type described, in the previous embodiment is illustrated. The light source 12' is preferably a laser. The lens to be tested 60 may include three elements as shown. The plane mirror 62 is mounted for rotational displacement about axes 63 and 65 (FIG. 4) perpendicular to each other and to the axis of second beam 18. In addition, the plane mirror is displaceable in a linear direction towards and away from the beam splitter. To effect these translational and rotational displacements, plane mirror 62 is mounted by means of three piezo-electric transducers 64, 66, 68, to a stationary structural element 70. Transducers 64, 66, 68, as shown, may be in the form of rods of piezo-electric material provided with suitable energizing electrodes and conductors, now shown. The rods may be energized under the control of the same computer (44) as that which records the CPSF, to extend or retract selectively as required to produce the desired mode and amount of displacement of reflector 62. Thus, for example, to effect translation only the rods are caused to extend and retract in unison. For rotation about axis 63, rods 64 and 68 can be extended and retracted in phase opposition to rod 66 or rod 66 may simply be left static.

The input and output lenses 30 and 40 of the interferometer need not be of a good quality since their abberations do not effect the measurements of the CPSF. In other interferometric methods, the quality of the beam splitter and the plane mirror are essential but in the case of the present invention which may be controlled by a computer, the influence of their effects on the CPSF can be easily corrected by deconvolution calculus. In addition, the present device is very rugged due to the absence of moving parts with the exceptance of the piezo-electric rods and mount.

It is also within the contemplation of this invention to test other optical components in addition to lenses, namely, without limitation, prisms, diffraction gratings, and mirrors and the like. In the case of testing mirrors, a lens of known configuration is utilized and the shape of the mirror surface is determined.

It can thus be understood by one skilled in the art that there has been provided an instrument and method which can quickly and accurately measure the quality of lenses, provides for unlimited resolution of the lenses and measures different types of lenses.

While there has been described what is at present cnsidered to be the prefered embodiment of the invention, it will obvious to those skilled in the art that various changes and modifications may be made therein without departing from the invention, and it is, therefore, aimed in the appended claims to cover all such changes and modifications as fall within the true spirit and scope of the invention.

I claim:

1. An interferometric system for testing an optical component comprising:
   (a) a source of light,
   (b) a beam splitter in the path of the light for dividing the light into first and second beams,
   (c) means for holding the optical component to be tested in the path of said first beam,
   (d) reflector means disposed in the path of said first beam beyond the means for holding the optical component for reflecting said first beam to said beam splitter,
   (e) second reflector means in the path of said second beam for reflecting said second beam to said beam splitter to form a single recombined beam, at least one of said reflector means being movable in translation along the axis of the beam it reflects and in rotation about a second axis in the plane of the reflector means and perpendicular to said first axis, and
   (f) a single detector means for receiving the entire recombined beam and converting same to an electrical signal for representing the complex point spread function of the optical component to be tested.

2. The interferometric system of claim 1 wherein said movable reflector means is a mirror.

3. The interferometric system of claim 2 wherein said reflector means is movable in rotation about a third axis perpendicular to said first and second axes.

4. The interferometric system of claim 1 wherein optical component means is disposed in the path of said single recombined beam for focusing the latter said beam onto the detecting means.

5. The interferometric system of claim 4 wherein electrically activated rods adjust the mirror in response to said means for detecting.

6. The interferometric system of claim 1 wherein said one of reflector means is a spherical mirror.

7. The interferometric system of claim 1, wherein said optical component is a lens.

8. The interferometric system of claim 1, wherein said optical component comprises a prism.

9. A method of testing a lens comprising the steps of:
   (a) splitting a light beam into first and second light beams,
   (b) supporting a lens to be tested in the path of said first light beam,
   (c) reflecting said first and second light beams to recombine and form a single recombined light beam,
   (d) varying the angle of reflection and path length of the second light beam, and
   (e) photoelectrically detecting the entire recombined beam to generate an output signal representative of the complex point spread function of the lens.

* * * * *

UNITED STATES PATENT AND TRADEMARK OFFICE
CERTIFICATE OF CORRECTION

PATENT NO. : 4,347,000                      Page 1 of 2

DATED : August 31, 1982

INVENTOR(S) : Francois P.G. Lacoste

It is certified that error appears in the above-identified patent and that said Letters Patent are hereby corrected as shown below:

Column 1, line 23, change "clasically" to --classically--, line 43, change "uncertainity" to --uncertainty--, Column 2, line 34, change "of" to --for--, Column 4, line 41, change "$\xi = 2\pi x/\lambda$ fo i$\eta = 2\lambda y/\lambda$ fo" to --$\xi = 2\pi x/\lambda$ fo i$\eta = 2\pi y/\lambda$ fo--

Column 5, line 7, before "$\sqrt{I, D})$, )" insert --(--, line 32, change "molulus" to --modulus--, line 34, change "transform" to --Transform--, line 43, remove "10", line 45, after laser and before the period, insert --20 and beam expander 28--,

UNITED STATES PATENT AND TRADEMARK OFFICE
CERTIFICATE OF CORRECTION

PATENT NO. : 4,347,000

DATED : August 31, 1982

INVENTOR(S) : Francois P. G. Lacoste

It is certified that error appears in the above-identified patent and that said Letters Patent are hereby corrected as shown below:

Column 6, line 21, change "cnsidered" to --considered--, and "prefered" to --preferred-- line 22, after will insert --be--.

Signed and Sealed this

First Day of March 1983

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,347,000
DATED : August 31, 1982
INVENTOR(S) : Francois P. G. Lacoste It is certified that error appears in the above-identified patent and that said Letters Patent are hereby corrected as shown below:

On the title page, in the heading of the patent, delete

"[73] Assignee: The Perkin-Elmer Corporation,

Norwalk, Conn."

Signed and Sealed this

Tenth Day of July 1984

[SEAL]

Attest:

GERALD J. MOSSINGHOFF

Attesting Officer     Commissioner of Patents and Trademarks